Oct. 31, 1961  R. H. JORDAN  3,006,735
QUICK-DIP INDICATOR
Filed Sept. 22, 1959
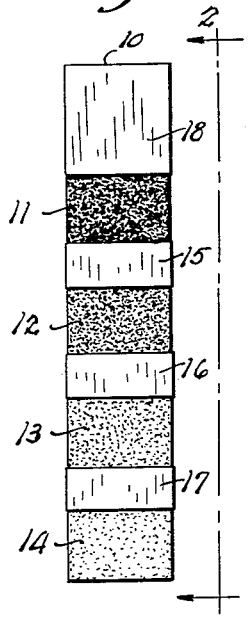
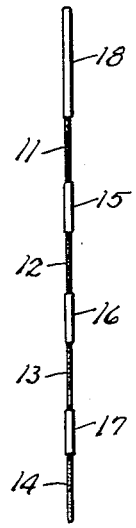
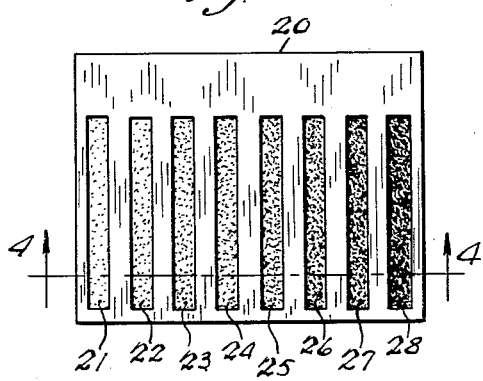
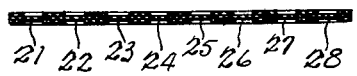
INVENTOR.
Robert H. Jordan
BY
Olson, Mecklenburger, van Holst,
Pendleton & Neuman. Attys.

United States Patent Office 3,006,735
Patented Oct. 31, 1961

3,006,735
QUICK-DIP INDICATOR
Robert H. Jordan, Chicago, Ill., assignor to Morton Salt Company, Chicago, Ill., a corporation of Illinois
Filed Sept. 22, 1959, Ser. No. 841,570
10 Claims. (Cl. 23—230)

This invention relates to an indicator for quickly determining the concentration of a particular ionizable element or elements in a liquid and, more specifically, to a quick-dip indicator and method for simply and inexpensively determining the hardness of water.

In modern laboratories and industrial installations, there are many instances wherein the concentration of ions, either cationic or anionic, in liquids, e.g., water, aqueous solutions, lower molecular weight alcohols such as methanol, or the like must be measured rapidly or repeatedly, primarily, for analytical and control purposes. Generally, techniques are available for such measurements, but such techniques are often costly, time-consuming, complicated, or otherwise inconvenient.

Similarly, in the modern home, there exists a long-felt need for like measurements, particularly with respect to the "hardness" of water, i.e., the concentration of calcium and magnesium ions resulting from the presence in the water of various salts thereof, i.e., carbonates, chlorides, sulfates, and/or the like, to determine whether a water softener installation is desirable and/or justifiable. Heretofore, such measurements required the services of an outside expert with attendant high cost. Furthermore, where the home owner already has a water softener installation and wants periodic checks on the performance thereof, repeated hardness measurements have been impractical.

Still further, with the rapid growth of the home automatic washing machine, and the like, a need has developed for a simple device or technique which would permit the average housewife to quickly determine with reasonable accuracy the hardness of the water she is using. With such measurement, she is then able to add to her wash water the proper amount of water softener, soap and/or detergent to achieve proper washing action without waste. Various simplified devices for such purposes have been developed, but all suffer from one or more shortcomings, such as, indicating only whether the ionic concentration is above or below a certain single level, rather than indicating what the particular level is; requiring a series of steps or determinations to ascertain the particular level; being too complex to suit the average housewife; and/or the like.

It is, therefore, an object of the present invention to provide a method and means for measuring the concentration of particular ions in liquids, which method and means are free of the aforementioned shortcomings.

It is a more specific object of the present invention to provide a simplified and inexpensive method and means for definitively determining the ionic concentration in a liquid, which method and means do not require any degree of skill by the user.

It is a further object of the present invention to provide a rapid one-step method and throw-away-type means for measuring the "hardness" of water, which method and means lend themselves to everyday household use.

These and other objects of the present invention will become apparent as the detailed description thereof proceeds.

To achieve these objects, a greatly simplified quick-dip indicator is provided which comprises a carrier absorptive to the liquid being analyzed, said carrier having a plurality of preferably-parallel spaced areas each of which contains a substance color responsive to a different concentration of the particular ion or ions being measured. To obtain a measurement with the indicator of the present invention, the indicator is simply dipped in the liquid and immediately removed therefrom. The concentration of ions in the liquid is shown by a color change in the spaced areas color responsive at ionic concentrations below that present in the liquid and the spaced areas color responsive at ionic concentrations above that present in the liquid. The precision of the determination can be simply adjusted by varying the number of spaced areas and the gradations in the concentration levels at which the color-responsive substances respond.

In a particular embodiment of the present invention, the spaces between the preferably-parallel spaced areas, and, optionally, other areas which do not contain the color-responsive substances, e.g., the finger-grip areas, are impregnated with or otherwise contain a material which is repellent to or otherwise not wetted by the liquid being analyzed. The barrier thus formed between the spaced areas prevents bleeding of the color-responsive material or the liquid being analyzed from one spaced area to another, which under certain circumstances could lead to inaccuracies in the determinations. In addition, the presence of a barrier permits the placement of the spaced areas on the absorptive carrier substantially contiguous to each other, i.e., with minimum spacing between each. Furthermore, the resultant coating of all unused portions of the carrier assures a substantially constant amount of liquid being absorbed by or otherwise contacting the color-responsive substances, regardless of the depth of dipping, so long as the spaced areas themselves are immersed.

The absorptive carrier may be any material known to the art, e.g., paper, porous wood, cotton, wool, synthetic fibers, or the like, so long as it is capable of holding the color responsive substance or substances and will rapidly absorb or otherwise pick up a substantially constant amount of the liquid being analyzed upon momentary immersion therein. The carrier itself should preferably be substantially free of the ion or ions being measured; alternatively, the color-responsive material should be adjusted to compensate for the particular level of ions inherently present in the carrier.

Because of its inexpensiveness and desirable absorptive characteristics, paper is ideally suited as a carrier. For example, when employing the present invention for determining the hardness of water, a commercial-grade calcium and magnesium-free absorptive paper is advantageously employed. Typically, such absorptive paper will hold from 100 to 500% of its own weight in water. Further, the amount a particular type of paper will absorb is substantially independent of the dipping period. Thus, whether the carrier is immersed for one second or five seconds, the amount of liquid absorbed is substantially the same. It is important in the method of the present invention, however, that the carrier not be immersed for a substantial period of time which would permit contact of the color-responsive substances with more liquid than the carrier would normally absorb. Thus by "quick-dipping," "momentary immersion," and the like is meant a dipping or immersion period of usually substantially less than about 10 seconds, preferably less than about 5 seconds, e.g., about 1 second.

The particular color-responsive substances which are used to impregnate the spaced areas of the carrier are those well known to the art. The particular substance or substances employed depend, of course, on the particular ion or ions being measured. For example, when measuring pH of an aqueous solution, various acid-base indicators color responsive at various pH levels are available (see, for example, "Lange's Handbook of Chemistry," ninth edition, copyright 1956 by Handbook Publishers, Inc., page 955). When measuring metal ions in aqueous solution, e.g., the alkaline earth metal ions such as calcium and/or magnesium, derivatives of certain aminopolycarboxylic-acids, such as ammoniatriacetic acid and ethylenediaminetetraacetic acid, preferably the latter, are employed with suitable metal indicators to provide a visual color change at the end-point. Other materials may also be present to regulate other properties, e.g., pH, or the like. Thus, when reference is made to impregnation of each spaced area with a "substance" color responsive at a particular ionic concentration, it should be understood that "substance" may comprise a plurality of ingredients and not necessarily a single ingredient.

Any method of incorporating the color-responsive substance or substances into the spaced areas may be employed. Since each spaced area is color-responsive to a different ionic concentration, the color responsive substance must be formulated or otherwise varied accordingly. For example, the ionic concentration response level of the substance may be adjusted by varying the ingredients thereof, and/or the proportion of particular ingredients and/or the amount used to impregnate, or the like. Typically, the color-responsive substance is applied to its respective area by first applying it to a roller (such as a conventional transfer wheel), and thereafter passing the absorbent carrier over or around the roller (or rolling the roller over the carrier) to transfer the substance thereto. For high speed production, a series of parallel-spaced rollers may be employed, each being supplied with its respective color-responsive substance. All of the spaced areas of the carrier are accordingly impregnated at a single pass with the corresponding color responsive substance.

The present invention and its advantages will be more clearly understood from the following detailed description of a specific embodiment thereof, read in conjunction with the accompanying drawing, wherein, FIG. 1 shows one embodiment of the present invention which is employed for water hardness determinations;

FIG. 2 is a view taken along line 2—2 of FIG. 1;

FIG. 3 shows a similar embodiment of the present invention which is also used for water hardness determinations but which employs vertical rather than horizontal stripping; and FIG. 4 is a section view taken along line 4—4 of FIG. 3.

Referring to FIG. 1, the quick-dip indicator comprises as a carrier a strip of calcium and magnesium-free commercial grade absorptive paper 10, said paper being capable of absorbing about 340 percent of its own weight of water. Strip 10 is impregnated at spaced areas 11 through 14 with color-responsive substances, each of which changes color at a particular hardness level. For example, the color-responsive substance in spaced area 11 may change at a hardness level (calcium and/or magnesium concentration) of about 20 grains per gallon, each grain being equivalent to about 17.1 parts per million by weight. Likewise, the color-responsive materials in spaced areas 12 through 14 may, for example, change color at hardness levels of about 15, 10 and 5 grains, respectively.

It is immediately apparent that much more precise determinations may be made by having a far greater number of spaced areas, each of which is impregnated with color-responsive substances graduated at whatever hardness interval is desired. In addition, by careful selection and control of the color-responsive substance, a still greater refinement in precision is possible. This alternative arises from the fact that with many indicators the color change is often gradual over about several grains of hardness. Thus, for example, where the color change begins at 10 grains hardness, it may not be complete until 13 or 14 grains. By careful color coding, each spaced area may therefore be used to cover a selected range.

In the specific embodiment of FIG. 1, the color-responsive substance for each spaced area comprises disodium dihydrogen ethylenediaminetetraacetate, a metal indicator, and a basic substance for control of pH. The amount of disodium dihydrogen ethylenediaminetetraacetate is varied for each spaced area to arrive at the desired hardness level at which a color change will result. The metal indicator is preferably Eriochrome Black T, i.e., sodium 1-(1-hydroxy-2-naphthylazo)-6-nitro-2-naphthol-4-sulfonate, but other metal indicators may also be used, e.g., Murexide, i.e., the ammonium salt of purpuric acid. The pH is normally adjusted to levels above about 7.5, e.g., about 10, by addition of any suitable non-interfering basic material, e.g., sodium hydroxide. It is at such an elevated pH that disodium dihydrogen ethylenediaminetetraacetate exhibits superior complexing efficiency with respect to alkaline earth metal ions. When employing Eriochrome Black T as the metal indicator, the end point of the color-responsive substance is evidenced by a distinct change in color from a bluish-gray to a pink. Detailed information with respect to the above-described color-responsive substances and similar substances may be found in "The Analytical Uses of Ethylenediamine Tetraacetic Acid" by Frank J. Welcher, copyright 1958 by D. Van Nostrand Company, Inc. (120 Alexander Street, Princeton, New Jersey).

Referring again to FIG. 1, the spaces between the spaced areas, i.e., spaces 15, 16, and 17 and also finger-grip area 18, are impregnated and coated with or otherwise contain a material which is repellent to or otherwise not wetted by the water to be analyzed by the quick-dip indicator. Any known materials for such purposes may be employed, provided, of course, that they do not interfere with the measurements being made. Examples of substances suitable for this purpose include various viscous hydrocarbon oils, waxes, such as paraffin waxes, silicones, printers varnish, or the like. The spaces are preferably impregnated and coated with the water-repellent material prior to adding the color-responsive substances, usually as aqueous solutions, to the spaced areas. Thus, the barrier formed by the water-repellent substance also prevents any bleeding of the color-responsive substances.

FIG. 2 is a side view taken along line 2—2 of FIG. 1. It illustrates how the spaces 15 through 18 substantially isolate spaced areas 11 through 14 respectively. In this specific embodiment, the areas are impregnated and coated with high-melting-point paraffin wax. For purposes of illustration, the thickness of the wax coating is exaggerated in FIG. 2; and it should be understood that, in practice, the coating itself is barely perceptible. Thus, while the water-repellent material must pass into or otherwise be absorbed by the carrier in spaces 15 through 18 so as to provide an effective barrier, the surface coating need only be of mono-molecular thickness.

FIG. 3 illustrates another version of the quick-dip indicator of the present invention, which may be employed for measuring the hardness of water with even greater precision. It represents a more refined version of the quick-dip indicator shown in FIGS. 1 and 2 in that a greater number of spaced areas are employed, the spaced areas are disposed vertically, and each of the spaced areas is isolated so that there are no edges which will contact the water in which it is dipped. The vertical disposition of the spaced areas has the advantage of avoiding any gravitational drainage of the water which is being analyzed from one spaced area to another.

Again, the carrier 20 is a calcium and magnesium-free commercial grade absorptive paper, and the color-responsive substances in the spaced areas 21 through 28 comprise disodium dihydrogen ethylenediaminetetraacetate, a metal indicator such as Eriochrome Black T, and a basic material such as sodium hydroxide to adjust the pH to the preferred level of above about 7.5. To prevent bleeding of the color-responsive substance and/or the water in which the quick-dip indicator is immersed, the carrier is impregnated with and coated with a water repellent material such as a paraffin wax in all spaces except the spaced areas containing the color-responsive substances.

FIG. 4 is a cross section view taken along section line 4—4 of FIG. 3. It portrays how the spaced areas are isolated from one another by the water-repellent impregnating and coating substance. As indicated in connection with FIG. 2, the coating formed by the water-repellent substance in FIG. 4 is exaggerated in thickness for illustrative purposes.

It is readily apparent in FIGS. 1 through 4 that the quick-dip indicator of the present invention may be designed so as to read in any units desired. For example, each spaced area may be designed to read directly in terms of grains of hardness. For this purpose, the particular hardness level represented by each spaced area may be imprinted thereon. Alternatively, each spaced area may be correlated to read in terms of the monetary cost of the disability associated with that particular hardness level. As another alternative, each spaced area may be correlated to read in terms of amount of water softener material which should be added per unit volume of water to bring it to the desired level of softness. In all cases, the units to which each spaced area correspond may be imprinted directly thereon or may be presented in a separate coding guide, which may accompany a supply of the quick-dip indicators. These and other alternatives are, in the light of the above disclosure, within the skill of the art.

The invention will be more clearly understood from consideration of the following specific examples thereof.

*Example I*

A quick-dip indicator for measuring hardness of water, similar to the configuration shown in FIGS. 1 and 2, was prepared and tested as hereinafter described. The carrier was Whatman No. 44 filter paper which absorbs about 170 percent of its own weight of water. The color-responsive substances for the spaced areas were formulated from aqueous solutions containing 0.36 percent by weight of sodium hydroxide, 0.90 percent by weight of Eriochrome Black T, and varying quantities of disodium dihydrogen ethylenediaminetetraacetate ($Na_2H_2$ EDTA), as indicated in the table below.

After application of the color-responsive material to the carrier, the carrier was placed in an electric oven for about ten minutes at a temperature of about 220° F. The resulting quick-dip indicator contained the following amounts of color-responsive substances in each of the four spaced areas:

| Hardness Range, Grains/Gal. | $Na_2H_2$ EDTA, Percent in Impregnating Solution | Chemical in Dry Paper, Milligrams per gram of paper. | | |
|---|---|---|---|---|
| | | $Na_2H_2$ EDTA | NaOH | Eriochrome Black T |
| 4-8 | 0.018 | 0.3 | 6 | 15 |
| 8-16 | 0.072 | 1.2 | 6 | 15 |
| 16-24 | 0.18 | 3.0 | 6 | 15 |
| 20-32 | 0.25 | 4.3 | 6 | 15 |

When the quick-dip indicator was placed in various water samples of varying hardness, it was found that the bluish-gray color started to change to a pink at the lower hardness value of the range indicated in the left-hand column of above table and completed the color change at the upper hardness value of the range indicated.

*Example II*

Another quick-dip indicator is prepared from the same paper and the same color-responsive materials and employing the same technique described in Example I, except that prior to adding the color-responsive materials to the spaced areas of the carrier, the spaces between the spaced areas are impregnated and coated with a high-melting point paraffin wax. While the paraffin wax softens somewhat during the drying operation, it is not lost from the carrier because of the retentivity characteristics of the paper and the fineness of the wax coating. When tested in water of various hardness levels the quick-dip indicator so produced is found to give results similar to that described in Example I except that the indicator is now free of any bleeding effects from one spaced area to another.

*Example III*

A quick-dip indicator for measuring pH of aqueous solutions, similar to the configuration shown in FIGS. 3 and 4 but containing only seven spaced areas, instead of eight, is prepared as hereinafter described. The carrier is Whatman No. 44 filter paper which absorbs about 170 percent of its own weight of water. The color-responsive substances, solutions of which are used to impregnate the carrier, which is thereafter dried, are selected to obtain the desired graduations in pH, as follows:

| pH Range | Indicator | Solvent | Color | |
|---|---|---|---|---|
| | | | Acid | Alkaline |
| 1.2-2.8 | Thymolsulfonphthalein. | Water (+NaOH). | Red | Yellow. |
| 3.0-4.6 | Tetrabromophenolsulfonphthalein. | do | Yellow | Blue-Violet. |
| 4.4-6.2 | Dimethylaminobenzene-o-carboxylic-acid. | do | Red | Yellow. |
| 6.4-8.0 | Phenolsulfonphthalein. | do | Yellow | Red. |
| 8.0-10.0 | Phenolphthalein. | 90% Alcohol | Colorless | Do. |
| 10.0-12.0 | Sodium salt of p-nitranilineazosalicylic acid. | Water | Yellow | Do. |
| 12.0-13.4 | Trinitrobenzoic acid (indicator salt). | do | Colorless | Orange-Red. |

The resulting quick-dip indicator is found to give a definitive pH reading even when employed by inexperienced users.

From the above detailed description and examples, it is apparent that the objects of this invention have been achieved. Specifically, a simplified and inexpensive method and means is provided for definitely determining the ionic concentration in a liquid, which method and means require substantially no skill on the part of the user. In addition, a rapid, one-step method and throwaway-type means is provided for measuring the hardness of water, which method and means lend themselves to everyday household use.

While particular embodiments of this invention have been described hereinabove, it will be understood, of course, that the invention is not limited thereto. Many modifications will be apparent from the above description to those skilled in the art, and it is contemplated by the claims of this specification to cover any such modifications as fall within the true spirit and scope of this invention.

Having thus described the invention, what is claimed is:

1. A quick-dip indicator for measuring the hardness of water which comprises a carrier absorptive to water, said carrier having a plurality of spaced areas, each of which is impregnated with a substance color-responsive to a different concentration of calcium and magnesium ions.

2. A quick-dip indicator for measuring the concentration of calcium and magnesium ions in water which comprises a carrier absorptive to water, said carrier having a plurality of spaced areas, each of which is impregnated with a substance color-responsive to a different concentration of calcium and magnesium ions, and the spaces between which are impregnated with a water-repellent material.

3. A quick-dip indicator for measuring the hardness of water which comprises a carrier absorptive to water, said carrier having a plurality of individual areas, each of which is impregnated with a substance color-responsive to a different concentration of at least calcium and magnesium ions, said substance in each individual area comprising a derivative of an aminopolycarboxylic acid and an indicator color-responsive to the presence of such ions, the amount of said derivative being varied in the individual areas to achieve the different color responsivenesses.

4. A quick-dip indicator for measuring the concentration of calcium and magnesium ions in water which comprises absorptive paper, substantially free of calcium and magnesium, said paper having a plurality of substantially-parallel spaced areas each of which is impregnated with, and having dried thereon, a substance color-responsive to a different concentration of at least calcium and magnesium ions, said substance in each spaced area comprising disodium dihydrogen ethylenediaminetetraacetate and Eriochrome Black T, the amount of said disodium dihydrogen ethylenediaminetetraacetate in the spaced areas being varied to achieve the different color-responsivenesses, the spaces between said spaced areas being impregnated with a water-repellent material.

5. A quick-dip indicator for measuring the concentration of calcium and magnesium ions in water which comprises absorptive paper having a plurality of individual areas each of which is impregnated with, and having dried thereon, a substance color-responsive to a different concentration of calcium and magnesium ions, said substance in each area comprising disodium dihydrogen ethylenediaminetetraacetate, an indicator color-responsive to the presence of calcium and magnesium ions, and sufficient non-interfering basic material whereby pH of said substance, after momentary dipping in water, is above about 7.5, the amount of disodium dihydrogen ethylenediaminetetraacetate in said areas being varied to achieve the different color-responsivenesses.

6. A method for measuring the hardness of water which comprises quickly dipping in said water a quick-dip indicator comprising a carrier absorptive to water, said carrier having a plurality of indivdiual areas, each of which is impregnated with a substance color-responsive to a different concentration of at least calcium and magnesium ions, the dipping being sufficient to momentarily and completely immerse said individual areas, whereby concentration of calcium and magnesium ions in said water is indicated by the color response of those individual areas color-responsive to concentrations not in excess of the concentration of calcium and magnesium ions in said water.

7. A method for measuring the concentration of calcium and magnesium ions in water which comprises momentarily dipping in said water a quick-dip indicator comprising absorptive paper having a plurality of spaced areas each of which is impregnated with a substance color-responsive to a different concentration of calcium and magnesium ions, the spaces between said spaced areas being impregnated with a water-repellent material, the dipping being sufficient to completely immerse said spaced areas, whereby concentration of calcium and magnesium ions in said water is indicated by the color response of those spaced areas color-responsive to concentrations not in excess of the concentration of calcium and magnesium ions in said water.

8. A method for measuring the hardness of water which comprises momentarily contacting said water with a quick-dip indicator comprising a carrier absorptive to water, said carrier having a plurality of individual areas, each of which is impregnated with a substance color-responsive to a different concentration of calcium and magnesium ions, said substance in each individual area comprising a derivative of an aminopolycarboxylic acid and an indicator color-responsive to the presence of calcium and magnesium ions, the amount of said derivative being varied in the individual areas to achieve the different color-responsivenesses, the contacting step being sufficient to completely immerse said individual areas, whereby concentration of calcium and magnesium ions is indicated by the color response of those individual areas color-responsive to concentrations not in excess of the concentration of calcium and magnesium ions in said water.

9. A method for measuring the concentration of calcium and magnesium ions in water which comprises momentarily immersing in said water a quick-dip indicator comprising absorptive paper, said paper being substantially free of calcium and magnesium and having a plurality of substantially-parallel spaced areas each of which is impregnated with a substance color-responsive to a different concentration of at least calcium and magnesium ions, said substance in each spaced area comprising disodium dihydrogen ethylenediaminetetraacetate and Eriochrome Black T, the amount of said disodium dihydrogen ethylenediaminetetraacetate in the spaced areas being varied to achieve the different color-responsivenesses, the spaces between said spaced areas being impregnated with a water-repellent material, the immersing step being sufficient to completely immerse said spaced areas, whereby concentration of calcium and magnesium ions is indicated by the color response of those spaced areas color-responsive to concentrations not in excess of the concentration of calcium and magnesium ions in said water.

10. A method for measuring the concentration of calcium and magnesium ions in water which comprises momentarily immersing in said water a quick-dip indicator comprising absorptive paper having a plurality of individual areas each of which is impregnated with, and having dried thereon, a substance color-responsive to a different concentration of calcium and magnesium ions, said substance in each individual area comprising disodium dihydrogen ethylenediaminetetraacetate, an indicator color-responsive to the presence of such ions, and sufficient non-interfering basic material whereby pH of said substance, upon momentary immersion in water, is above about 7.5, the amount of disodium dihydrogen ethylenediaminetetraacetate in said areas being varied to achieve the different color-responsivenesses, the immersing step being sufficient to momentarily and completely immerse said individual areas, whereby concentration of calcium and magnesium ions is indicated by the color response of those spaced areas color-responsive to concentrations not in excess of the concentration of calcium and magnesium ions in said water.

References Cited in the file of this patent

UNITED STATES PATENTS

| | | |
|---|---|---|
| 2,167,304 | Kloz | July 25, 1933 |
| 2,129,754 | Yagoda | Sept. 13, 1938 |
| 2,567,445 | Parker | Sept. 11, 1951 |